United States Patent
Lihl et al.

(10) Patent No.: US 10,901,196 B2
(45) Date of Patent: Jan. 26, 2021

(54) LIGHT MICROSCOPE HAVING A SAMPLE STAGE FOR CRYOMICROSCOPY

(71) Applicants: Leica Mikrosysteme GmbH, Vienna (AT); European Molecular Biology Laboratory, Heidelberg (DE)

(72) Inventors: Reinhard Lihl, Vienna (AT); John Briggs, Heidelberg (DE); Martin Schorb, Ladenburg (DE); Leander Gaechter, Oberriet SG (CH)

(73) Assignees: LEICA MIKROSYSTEME GMBH, Vienna (AT); EUROPEAN MOLECULAR BIOLOGY LABORATORY, Heidelberg (DE)

( * ) Notice: Subject to any disclaimer, the term of this patent is extended or adjusted under 35 U.S.C. 154(b) by 64 days.

(21) Appl. No.: 15/329,704

(22) PCT Filed: Jul. 15, 2015

(86) PCT No.: PCT/EP2015/066105
§ 371 (c)(1),
(2) Date: Jan. 27, 2017

(87) PCT Pub. No.: WO2016/016000
PCT Pub. Date: Feb. 4, 2016

(65) Prior Publication Data
US 2017/0227752 A1    Aug. 10, 2017

(30) Foreign Application Priority Data
Jul. 29, 2014 (DE) .................. 10 2014 110 723

(51) Int. Cl.
*G02B 21/28* (2006.01)
*G02B 21/34* (2006.01)
(Continued)

(52) U.S. Cl.
CPC .............. *G02B 21/28* (2013.01); *G02B 21/34* (2013.01); *G02B 21/02* (2013.01); *G02B 21/26* (2013.01)

(58) Field of Classification Search
CPC .. G02B 21/26–30; G02B 21/34; G02B 7/028; G02B 27/0006
(Continued)

(56) References Cited

U.S. PATENT DOCUMENTS

| 3,969,013 A | 7/1976 | Poty et al. |
| 5,048,300 A * | 9/1991 | Lihl .................. B01L 7/00 62/320 |

(Continued)

FOREIGN PATENT DOCUMENTS

| CN | 201615966 U | 10/2010 |
| DE | 22 10 442 | 9/1973 |

(Continued)

OTHER PUBLICATIONS

Leica Microsystems GMBH, product brochure: Leica EM VCT100 Vacuum Cryo Transfer, May 2009.

*Primary Examiner* — George G King
(74) *Attorney, Agent, or Firm* — Hodgson Russ LLP

(57) ABSTRACT

In a light microscope (1) for cryomicroscopy, encompassing at least an objective (2) and a sample stage (3) having a cutout (7) for a coolable holder (8) for a sample carrier mount, the cutout (7) being covered by a cover (6), the sample stage (3) is displaceable in two horizontal directions (4). The cover (6) rests floatingly on the sample stage (3), and the objective (2) passes through a cutout (12), corresponding to the objective (2), in the cover (6). The method for cooling a holder (8) for a sample carrier mount in a light microscope (1) for cryomicroscopes, by means of a flow of liquid nitrogen through a cooling conduit (15), open at at least one end, in the holder (8), is notable for the fact that the (Continued)

quantity of liquid nitrogen is dimensioned so that all of the nitrogen is present in gaseous form at at least one open end (16) of the cooling conduit (15).

8 Claims, 4 Drawing Sheets

(51) Int. Cl.
    *G02B 21/02*     (2006.01)
    *G02B 21/26*     (2006.01)

(58) Field of Classification Search
    USPC ........ 359/391–398, 507, 509, 512, 513, 820
    See application file for complete search history.

(56) References Cited

U.S. PATENT DOCUMENTS

| | | |
|---|---|---|
| 5,257,128 A | 10/1993 | Diller et al. |
| 8,395,130 B2 | 3/2013 | Gaechter |
| 10,345,570 B2 * | 7/2019 | Singer .................... G02B 21/26 |
| 2005/0248836 A1 * | 11/2005 | Tsuchiya ............ G01N 21/0332 |
| | | 359/368 |
| 2006/0141613 A1 | 6/2006 | Tsuchiya et al. |
| 2010/0110540 A1 | 5/2010 | Niv et al. |
| 2010/0134881 A1 | 6/2010 | Lippert et al. |
| 2015/0248002 A1 * | 9/2015 | Ingersoll ................ G02B 21/28 |
| | | 359/395 |
| 2017/0123198 A1 * | 5/2017 | Singer ................ G01N 21/0332 |

FOREIGN PATENT DOCUMENTS

| | | |
|---|---|---|
| DE | 10 2005 051 386 A1 | 5/2007 |
| JP | S62125211 U1 | 8/1987 |
| JP | H0277842 U | 6/1990 |
| JP | H04213404 A | 8/1992 |
| JP | 2004141143 A | 5/2004 |
| JP | 2011229474 A | 11/2011 |
| JP | 2013025163 A | 2/2013 |
| SU | 1016641 | 5/1983 |

\* cited by examiner

LIGHT MICROSCOPE HAVING A SAMPLE STAGE FOR CRYOMICROSCOPY

CROSS-REFERENCE TO RELATED APPLICATIONS

The present application is the U.S. national phase of International Application No. PCT/EP2015/066105 filed Jul. 15, 2015, which claims priority of German Application No. 10 2014 110 723.3 filed Jul. 29, 2014, the entirety of which is incorporated herein by reference.

FIELD OF THE INVENTION

The invention relates to a light microscope for cryomicroscopy, encompassing at least an objective and a sample stage having a cutout for a holder, coolable on the microscope, for a sample carrier mount, the cutout being covered by a cover.

BACKGROUND OF THE INVENTION

Cryofixation is a sample preparation method often used in electron microscopy. In this, a water-containing sample is frozen very rapidly to a temperature below −150° C. (cryofixed), i.e. it is cooled very quickly in order to avoid the formation of ice crystals. Cryofixation has proven to be particularly suitable for investigations of structural biology. The specimens to be investigated, for example cells, enzymes, viruses, or lipid layers, are thereby embedded in a thin, vitrified layer of ice. The great advantage of cryofixation is that the biological structures can be maintained in their natural state. For example, a biological process can be halted at an arbitrary point in time by cryofixation and investigated in that vitrified state, for example using a cryo-electron microscope but also in a light microscope with corresponding sample cooling; cryo-light microscopy serves principally for ascertaining relevant regions in the sample, those regions being noted and then viewed in more detail in a cryo-electron microscope.

The frozen samples, which as a rule are located on an electron microscopy sample carrier known per se, for example a grid or a pin for scanning electron microscopy, must be conveyed, under the aforesaid cryogenic conditions and with water excluded, into corresponding sample carrier mounts that can then be conveyed into appropriate holders in the aforesaid microscopes. A typical sample carrier mount for use in conjunction with the present invention has been disclosed, for example, in the document U.S. Pat. No. 8,395,130 B2, in which a grid that serves as a sample carrier and carries the cryogenic sample can be secured with clip elements in a corresponding mount. For this, liquid nitrogen is made available, for example, in a Styrofoam container, in which container the necessary manipulation steps for conveying the grid into the sample carrier mounts were accomplished. The formation of cryogenic nitrogen gas from the liquid nitrogen on the one hand ensures the necessary low temperature and on the other hand creates an anhydrous atmosphere, so that contamination of the samples with water, and consequently with ice crystals, is prevented.

In order not to impair the quality of the frozen samples, it is very important that they be transferred in cooled and contamination-free fashion between the processing devices being used, for example cryofixation device, freeze fracture apparatus, or coating apparatus, and the analytical devices, here especially a cryo-light microscope and cryo-electron microscope.

One vacuum cryo-transfer system is represented, for example, by the "Leica EM VCT100" system of the manufacturer Leica Microsystems, with which a sample carrier mount can be removed from a liquid nitrogen-cooled manipulation container and conveyed into the observation chamber, likewise cooled with liquid nitrogen, of an electron microscope.

A sample carrier mount could also be transferred with such an apparatus into the cooled sample stage of a cryo-light microscope. It is self-evident to one skilled in the art that the term "coolable" in conjunction with the present invention means that the components referred to as "coolable" are coolable using special cooling systems that are provided on the microscope or attached to it in order to ensure cooling of the cryogenic samples during observation through the microscope.

It is apparent that in the context of sample preparation for cryomicroscopy, considerable effort is expended in order to avoid contamination of the sample with water and consequently with ice crystals. Clearly, this must also be ensured after transfer of the sample or sample carrier or sample carrier mount into the working region of a cryo-light microscope; sample stages for light microscopes, which comprise a cutout in which a coolable holder for a sample carrier mount is located, are available for this purpose in the existing art. In addition to cooling of the holder, with these known sample stages the cutout is supplied or flushed with liquid nitrogen or with cryogenic nitrogen gas, the cutout being covered with a cover in order to limit nitrogen consumption and prevent the entry of moisture from the air; in this, a slight overpressure is established by the nitrogen gas that is delivered or is produced from the liquid nitrogen, so that ambient air is forced out of the cutout and prevented from flowing in. With these known approaches the cover is transparent, since it is located in the beam path of the light microscope. The objective of the light microscope can be brought in, however, only until it is directly against the cover, thus producing a not insignificant spacing between the objective and the sample, which in turn results in a small aperture and, associated therewith, low resolution.

SUMMARY OF THE INVENTION

The object on which the invention is based is therefore that of overcoming the disadvantages of the existing art in cryo-light microscopy and enabling a large aperture for viewing while reliably shielding the sample from moisture.

In order to achieve this object, a light microscope of the kind recited previously is refined according to the present invention in such a way that the sample stage is displaceable in two horizontal directions; that the cover rests floatingly on the sample stage; and that the objective passes through a cutout, corresponding to the objective, in the cover. Thanks to the floating mounting of the cover, the horizontal displaceability of the sample stage can be retained even through the objective passes through the cover in order to bring the objective directly against the sample so as to achieve a large aperture.

According to a preferred embodiment of the present invention, the cutout in the cover is a circular hole whose diameter is less than 2 mm larger than the diameter of that part of the objective which is to be brought through the cover. These dimensions make it possible, after placement of the cover onto the cutout in the sample stage, to guide the objective through the cutout in the cover without great difficulty and at the same time to build up a sufficiently high overpressure with tolerable nitrogen consumption in order to reliably keep moisture away from the sample.

As already mentioned, in cryo-light microscopy a cooled holder for a sample carrier mount is arranged in a cutout of the sample stage. To avoid radiation of heat from the region of the sample stage onto the sample, the light microscope according to the present invention is preferably refined in such a way that the sample stage is coolable. The result is that the environment of the sample is also reliably cooled, and the desired state of the sample is continuously maintained.

The sample stage and/or the holder for a sample carrier mount preferably have a nitrogen internal cooling system. A cooling system of this kind is based on directing liquid or cryogenic gaseous nitrogen through a corresponding cooling conduit in the interior of the relevant parts, thereby resulting in highly efficient cooling of those parts. The cooling system can be exactly regulated by way of the flow rate of the nitrogen and an electric heating system.

The sample stage preferably has an opening for delivery of a sample carrier mount to the holder for a sample carrier mount. Such an opening is preferably provided laterally on the sample stage, and allows insertion of a sample or a sample carrier mount into the sample stage.

In order to prevent moist air from getting to the sample in the manipulation container even when no insertion is being made into the sample stage, however, the invention is preferably refined in such a way that the opening for delivery of a sample carrier mount is closable by means of a closure device. The closure device can preferably be configured as a slider, a flap, or the like.

Visual monitoring of the observation region is essential for the user even though the cutout in the sample stage is covered. The invention is therefore preferably refined in such a way that the cover comprises a transparent double panel. The transparency makes it possible to see through the cover, while the provision of a double panel prevents undesired condensation problems due to the temperature difference between the interior of the sample stage and the environment.

BRIEF DESCRIPTION OF THE DRAWING VIEWS

The invention will be explained in more detail below with reference to an exemplifying embodiment depicted schematically in the drawings, in which.

DETAILED DESCRIPTION OF THE INVENTION

Figure 1:
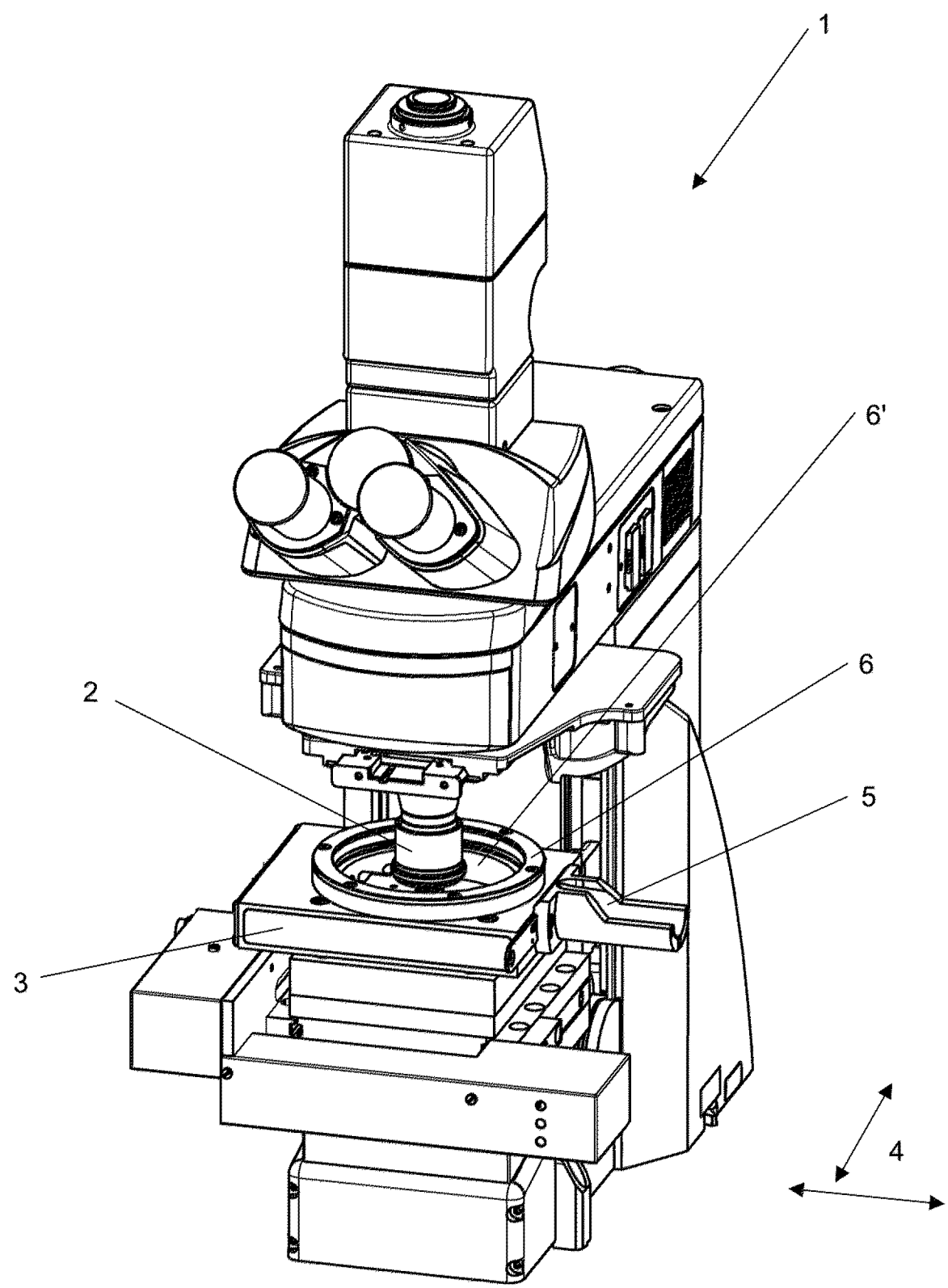
FIG. 1 is an overall view of a cryo-light microscope according to the present invention.
Figure 2:
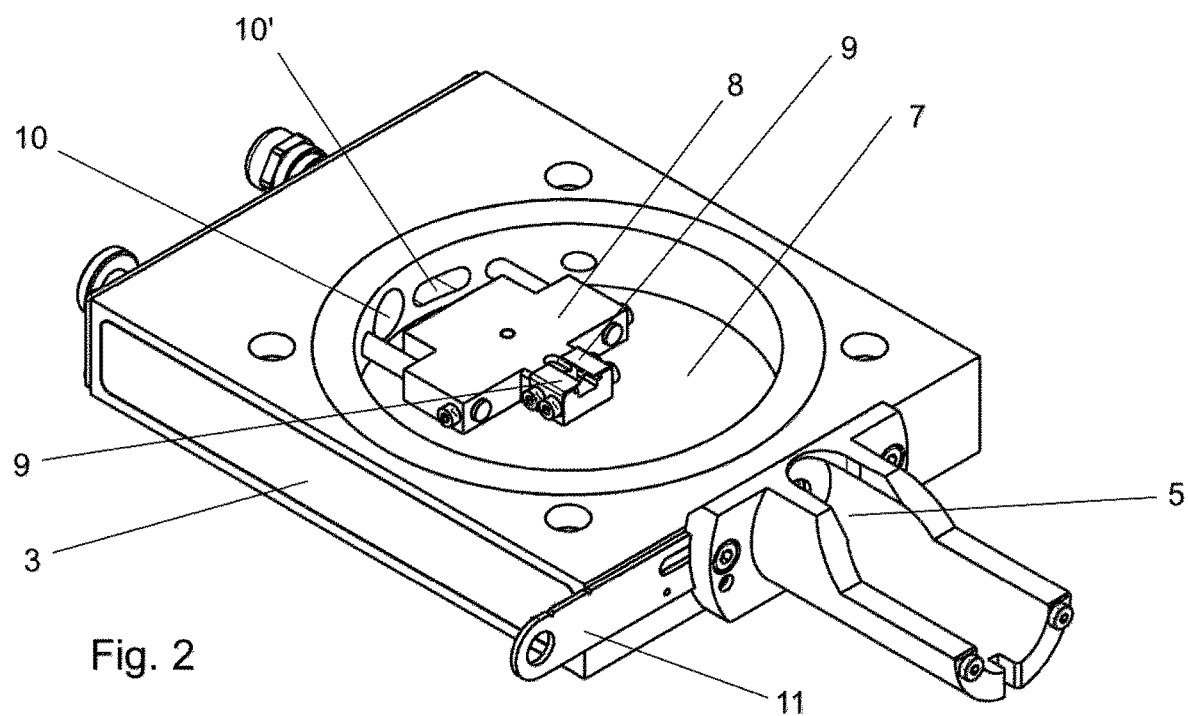
FIG. 2 is a perspective depiction of the sample stage of the cryo-light microscope according to the present invention, without the cover of the cutout in the sample stage.

In FIG. 1, the number 1 designates a cryo-light microscope according to the present invention that encompasses, inter alia, an objective 2 and a sample stage 3. Sample stage 3 can be displaced not only vertically but also in two horizontal directions in accordance with arrows 4, in order to ascertain relevant regions of a sample in sample stage 3. The sample stage possesses an opening 5 for delivery of a sample carrier mount to holder 8 for a sample carrier mount, which is depicted in FIG. 2. A cover 6 rests floatingly on sample stage 3 and can therefore be freely displaced thereon. Objective 2 is guided through the cutout in cover 6 and carries it along upon displacement of sample stage 3 in the direction of arrows 4. Cover 6 encompasses a transparent double panel 6'.

FIG. 2 shows a cutout 7 in sample stage 3, in which cutout a holder 8 for a sample carrier mount is located. Holder 8 for a sample carrier mount possesses clip elements 9 that serve for clamping immobilization of a sample carrier mount (not depicted). Holder 8 for a sample carrier mount possesses an infeed 10 and an outlet 10' for cryogenic nitrogen, so that holder 8 for a sample carrier mount can be cooled. This is described in further detail in conjunction with FIG. 5. FIG. 2 furthermore shows opening 5 for delivery of a sample carrier mount. A closure device 11 for closing off opening 5 is embodied in the form of a slider 11.

Figure 3:
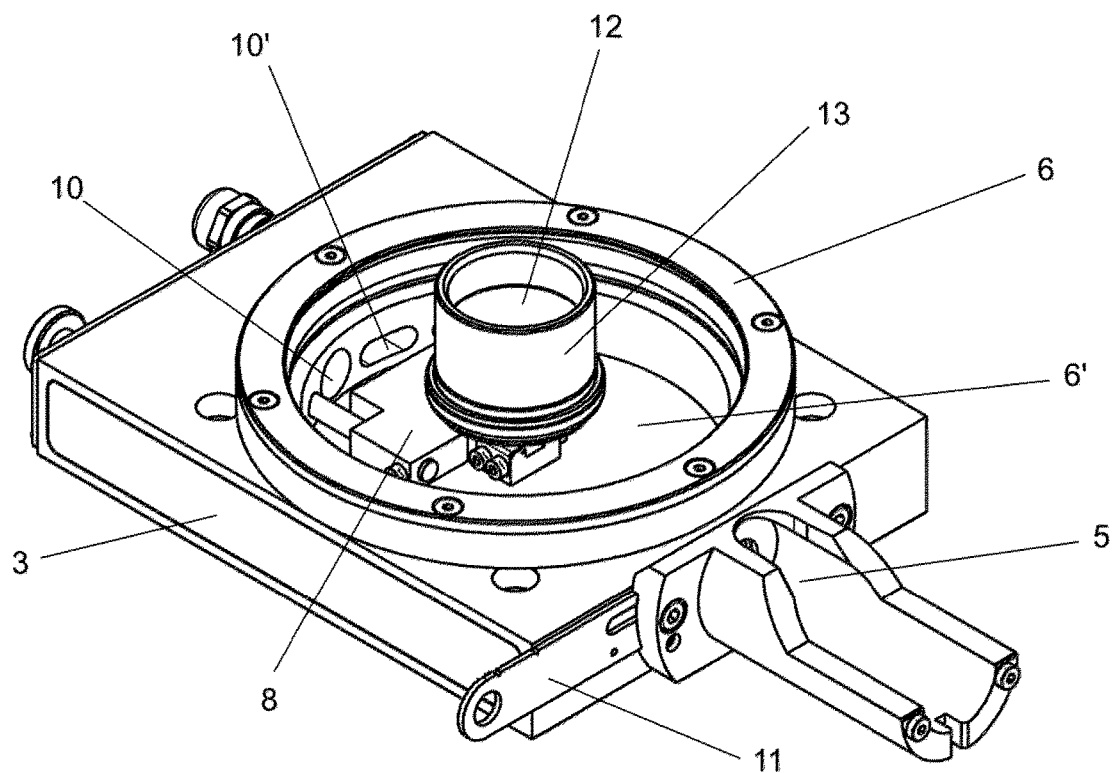
FIG. 3 is a perspective depiction of the sample stage of the cryo-light microscope according to the present invention, with the cover of the cutout in the sample stage.

FIG. 3 now shows that cover 6 completely covers cutout 7 in sample stage 3 in order to minimize the entry of moisture from the environment. Cutout 12 in cover 6 allows objective 2, depicted in FIG. 1, to be guided through the plane of cover 6 and thus to be brought directly against the sample in holder 8 for a sample carrier mount. A sleeve 13 is placed on cutout 12 and further enhances the sealing effect between objective 2 and cover 6. Because cover 6 rests floatingly on sample stage 3, it can readily be carried along by objective 2 and thus displaced on sample stage 3.

Figure 4:
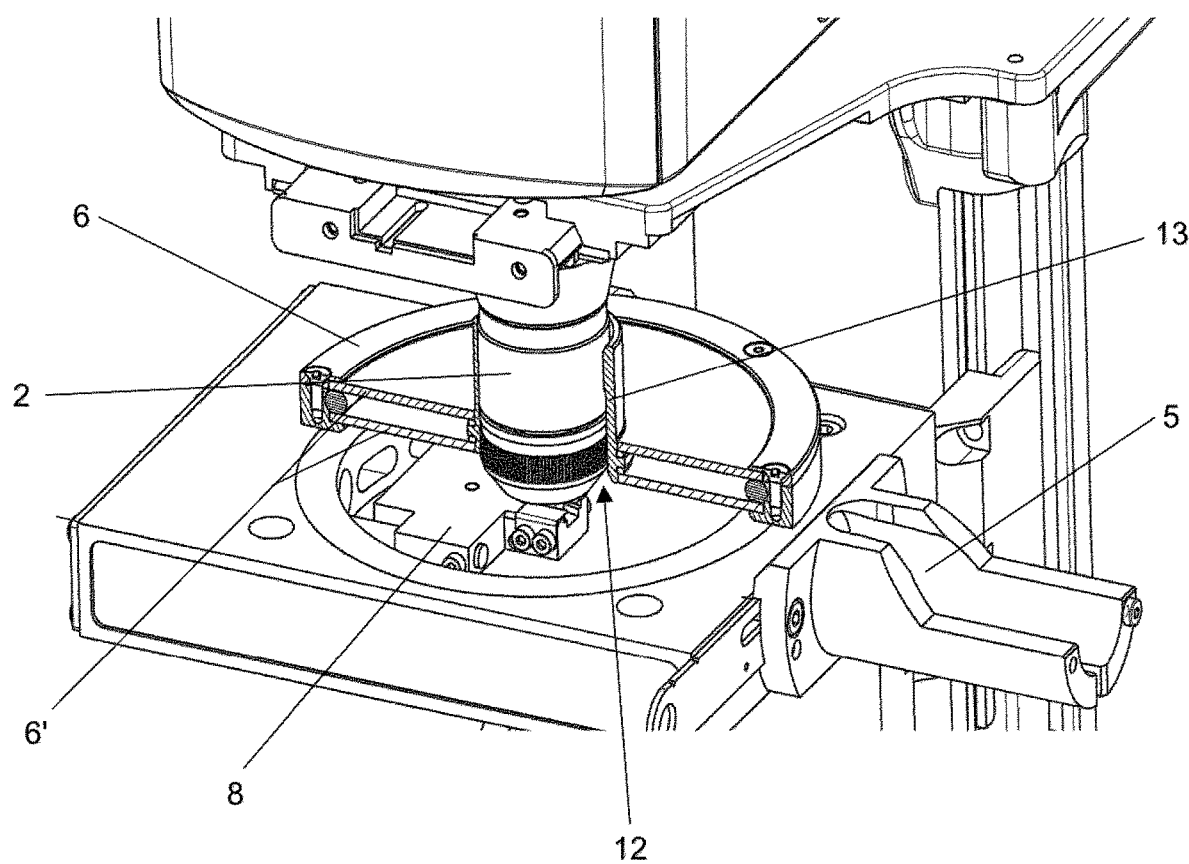
FIG. 4 is a partial section view of passage of the objective through the cover.

FIG. 4 shows the passage of objective 2 through cutout 12. Sleeve 13 rests more or less against objective 2 and thereby enhances the sealing effect between objective 2 and cover 6. It is further evident from FIG. 4 that cover 6 possesses a double panel 6' in order to forestall condensation problems.

Figure 5:
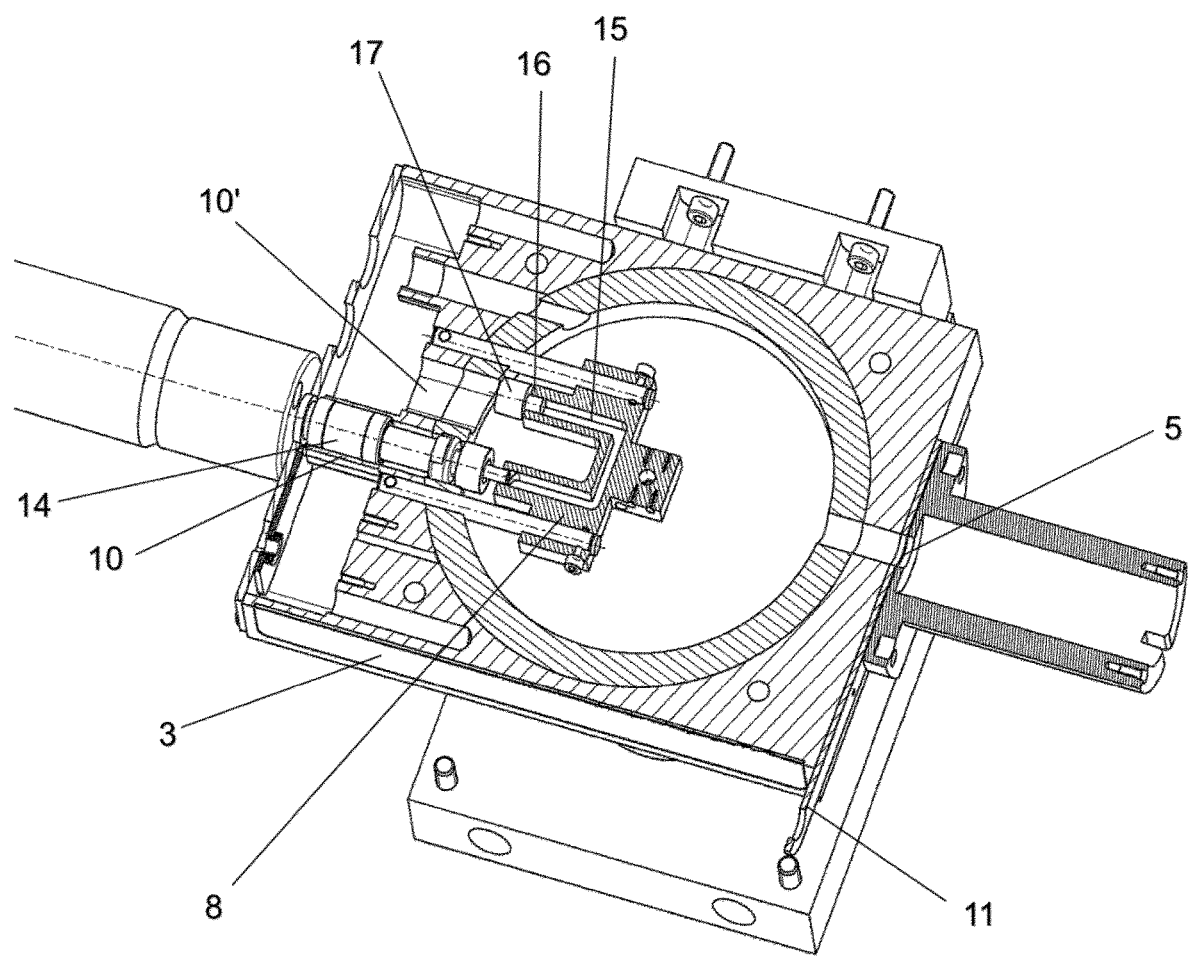
FIG. 5 is a partial section view of the holder for a sample carrier mount.

It is apparent from FIG. 5 that a nitrogen conduit 14 is guided through infeed 10 so that cryogenic liquid nitrogen can be guided into cooling conduit 15 of holder 8 for a sample carrier mount. Cooling conduit 15 has an open end 16 onto which a metal frit element is placed. Nitrogen leaves cutout 7 through outlet 10'. The above-described nitrogen internal cooling system in holder 8 for a sample carrier mount ensures reliable cooling of the samples, and forces out ambient moisture.

PARTS LIST

1 Cryo-light microscope
2 Objective
3 Sample stage
4 Arrows
5 Opening
6 Cover
6' Transparent double panel
7 Cutout
8 Sample holder
9 Clip elements
10 Infeed
10' Outlet
11 Closure device/slider
12 Cutout
13 Sleeve
14 Nitrogen conduit
15 Cooling conduit
16 Open end
17 Metal frit element

What is claimed is:

1. A light microscope (1) for cryomicroscopy, comprising an objective (2) and a sample stage (3) having a cutout (7) in which a coolable holder (8) for holding a sample carrier mount is located, the cutout (7) being covered by a cover (6),
   wherein the sample stage (3) is displaceable in two horizontal directions (4); the cover (6) rests floatingly on the sample stage (3); and the objective (2) passes through a cutout (12) in the cover (6);
   wherein the holder (8) is operable to immobilize the sample carrier mount directly on the holder (8) and the holder (8) has a nitrogen internal cooling system; and
   wherein the cover (6) comprises a double panel (6') having a first panel spaced apart from a second panel by a gap for reducing condensation on the cover.

2. The light microscope according to claim 1, wherein the cutout (12) in the cover (6) is a circular hole whose diameter is less than 2 mm larger than a diameter of a portion of the objective (2) which passes through the cutout (12) in the cover (6).

3. The light microscope according to claim 1, wherein the sample stage (3) is coolable.

4. The light microscope according to claim 1, wherein the sample stage (3) has an opening (5) for delivery of the sample carrier mount to the holder (8).

5. The light microscope according to claim 4, further comprising a closure device (10) operable to close the opening (5).

6. The light microscope according to claim 1, wherein the double panel (6') is transparent.

7. A method for cooling the holder (8) for holding a sample carrier mount in the light microscope (1) for cryomicroscopy according to claim 6, wherein the holder (8) is operable to immobilize the sample carrier mount directly on the holder (8), comprising:
   providing a cooling conduit (15) in the holder (8), the cooling conduit (15) having at least one open end (16),
   guiding a flow of liquid nitrogen through the cooling conduit (15) in the holder (8),
   wherein the flow of liquid nitrogen is dimensioned so that all of the nitrogen is present in gaseous form at the at least one open end (16) of the cooling conduit (15).

8. The method according to claim 7, wherein a metal frit element (17) is placed at the at least one open end (16) of the cooling conduit (15).

* * * * *